(12) United States Patent
Briercliffe

(10) Patent No.: US 12,120,167 B2
(45) Date of Patent: Oct. 15, 2024

(54) VIDEO COUPLER USING WAVELENGTH DIVISION MULTIPLEXING

(71) Applicant: Product Development Associates, Inc., Burnsville, MN (US)

(72) Inventor: Bradley Vernon Briercliffe, Burnsville, MN (US)

(73) Assignee: Product Development Associates, Inc., Burnsville, MN (US)

( * ) Notice: Subject to any disclaimer, the term of this patent is extended or adjusted under 35 U.S.C. 154(b) by 239 days.

(21) Appl. No.: 17/726,259

(22) Filed: Apr. 21, 2022

(65) Prior Publication Data

US 2023/0344890 A1 Oct. 26, 2023

(51) Int. Cl.
*H04L 65/75* (2022.01)
*H04J 14/02* (2006.01)

(52) U.S. Cl.
CPC .......... *H04L 65/75* (2022.05); *H04J 14/0227* (2013.01)

(58) Field of Classification Search
CPC ....... H04L 65/75; H04L 65/70; H04J 14/0227
See application file for complete search history.

(56) References Cited

U.S. PATENT DOCUMENTS

| | | | | |
|---|---|---|---|---|
| 6,025,944 A * | 2/2000 | Mendez | ................... | H04J 14/02 398/1 |
| 9,762,349 B1 * | 9/2017 | Dai | ....................... | H04J 3/1652 |
| 10,827,147 B1 * | 11/2020 | Briercliffe | ............. | H04L 65/765 |
| 2012/0051749 A1 | 3/2012 | Lee et al. | | |
| 2014/0341579 A1 * | 11/2014 | Effenberger | ........ | H04J 14/0221 398/68 |
| 2015/0055957 A1 * | 2/2015 | Lee | ..................... | H04J 14/0227 398/79 |
| 2016/0226618 A1 * | 8/2016 | Lee | ...................... | H04B 10/572 |
| 2022/0149953 A1 * | 5/2022 | Oh | .................. | H04B 10/25753 |
| 2023/0344890 A1 * | 10/2023 | Briercliffe | ............... | H04L 65/75 |
| 2023/0413369 A1 * | 12/2023 | Syed | .................. | H04N 21/2402 |

OTHER PUBLICATIONS

International Search Report and Written Opinion for PCT/US2022/025792, issued by the European Patent Office on Jan. 2, 2023; 10 pgs.

* cited by examiner

*Primary Examiner* — Tanya T Motsinger
(74) *Attorney, Agent, or Firm* — Mueting Raasch Group

(57) ABSTRACT

An apparatus for transmitting real-time video using wavelength division multiplexing. The apparatus may include an input, a transceiver, and processing circuitry. The input may receive at least native video data. The transceiver may transmit transport blocks via an optical transport link defining a plurality of optical channels using wavelength division multiplexing. The processing circuitry may be operatively coupled to the input and transceiver. The processing circuitry may be configured to receive a video frame of native video data from the encoder input and generate a transport block including a video segment of the video frame. The processing circuitry may further be configured to transmit the transport block including the video segment on an optical channel assigned to the apparatus using the transceiver.

18 Claims, 9 Drawing Sheets

VIDEO COUPLER USING WAVELENGTH DIVISION MULTIPLEXING

The present disclosure pertains to systems and methods for transmitting real-time video using transport blocks that include video segments.

Sharing live, or real-time, video for remote monitoring may utilize specialized hardware designed for specific video formats. This specialized hardware may have built-in limits to the number of live video connections allowed, which may make expansion and customization difficult and costly. At times, adding even a single video destination or output may require the entire video sharing system to be replaced. Additionally, video conversion hardware and/or software may also be needed to allow sharing and communication between video sources and destinations further adding to the complexity of such systems.

SUMMARY

Native video data can be transmitted using transport blocks via an optical transport link to allow real-time video transmission to one or more destinations that is format agnostic. Native video data may be divided into video segments that are transmitted in transport blocks and reconstructed into video frames and ultimately native video data at a destination. Video segments may include an accompanying, or associated, video segment number indicating a position of a video segment in a video frame of native video data. Transport blocks may be transmitted on an optical channel assigned to a source apparatus to allow any number of receiver apparatus without the use of an intermediate device such as network switch or other device to manage communication between devices coupled to the optical transport link.

An exemplary encoder apparatus may include an encoder input, an encoder transceiver, and processing circuitry. The encoder input may receive at least native video data. The encoder transceiver may transmit and receive transport blocks via an optical transport link defining a plurality of optical channels using wavelength division multiplexing. The processing circuitry may be operatively coupled to the encoder input and the encoder transceiver. The processing circuitry may be configured to receive a video frame of native video data from the encoder input and generate a transport block including a video segment of the video frame. The processing circuitry may be further configured to transmit the transport block including the video segment on an optical channel assigned to the encoder apparatus using the encoder transceiver.

An exemplary decoder apparatus may include a decoder transceiver to receive transport blocks via an optical transport link defining a plurality of optical channels using wavelength division multiplexing, a decoder output to transmit at least native video data, and processing circuitry operatively coupled to the decoder transceiver and decoder output. The processing circuitry may be configured to receive transport blocks from one of the plurality of optical channels using the decoder transceiver, each transport block comprising a video segment of a video frame of native video data. The processing circuitry may further be configured to reconstruct the native video data based on the received transport blocks and transmit the native video data using the decoder output.

An exemplary system may include an optical transport link defining a plurality of optical channels and a plurality of nodes. Each node of the plurality of nodes may be operatively coupled to the optical transport link. The plurality of nodes may include at one or more encoder apparatus and one or more decoder apparatus. Each of the one or more encoder apparatus may include an input to receive at least native video data, an encoder transceiver to transmit and receive transport blocks via the optical transport link using wavelength division multiplexing, and encoder processing circuitry operatively coupled to the input and the encoder transceiver. The encoder processing circuitry may be configured to receive native video data including at least a video frame from the input and generate transport blocks. Each transport block may include a video segment of the video frame. The encoder processing circuitry may further be configured to transmit the transport blocks on an optical channel assigned to the at least one encoder apparatus using the encoder transceiver. The one or more decoder apparatus may be operatively coupled to the at least one encoder apparatus via the optical transport link. Each of the one or more decoder apparatus may include a decoder transceiver to receive and transmit transport blocks via the optical transport link using wavelength division multiplexing, an output to transmit at least native video data, and decoder processing circuitry operatively coupled to the decoder transceiver and the output. The decoder processing circuitry may be configured to receive the transmitted transport blocks from one of the plurality of optical channels using the decoder transceiver and reconstruct the native video data based on the received transport blocks. The decoder processing circuitry may be further configured to transmit the reconstructed native video data using the output.

BRIEF DESCRIPTION OF THE DRAWINGS

Throughout the specification, reference is made to the appended drawings, where like reference numerals designate like elements, and wherein.

DETAILED DESCRIPTION

Figure 1:
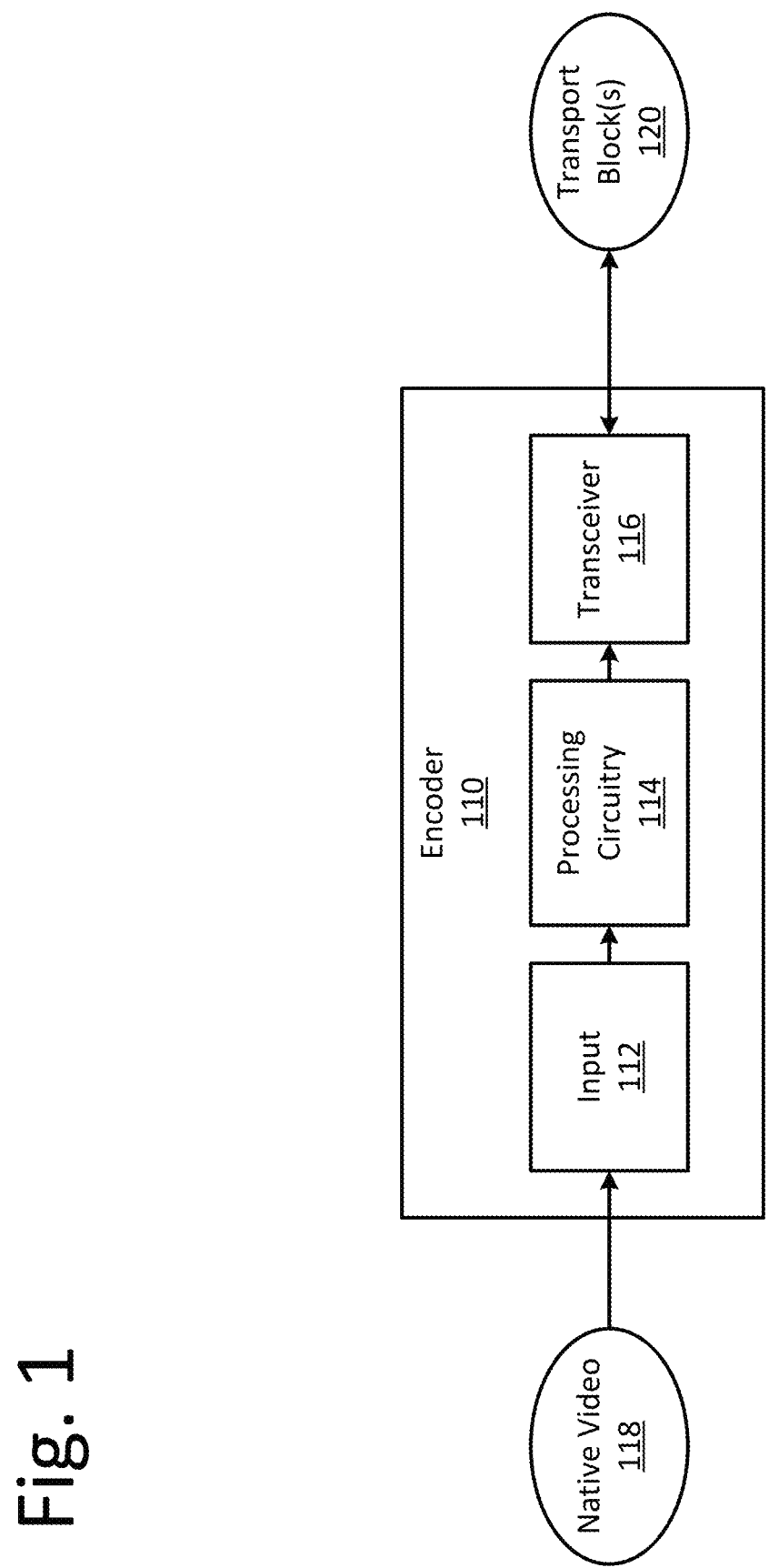
FIG. 1 is a schematic diagram of an encoder apparatus according to one embodiment for use with the illustrative systems, apparatus, and methods described herein.

Exemplary methods, apparatus, and systems shall be described with reference to FIGS. 1-9. It will be apparent to one skilled in the art that elements or processes from one embodiment may be used in combination with elements or processes of the other embodiments, and that the possible embodiments of such methods, apparatus, and systems using combinations of features set forth herein is not limited to the specific embodiments shown in the Figures and/or described herein. Further, it will be recognized that the embodiments described herein may include many elements that are not necessarily shown to scale. Still further, it will be recognized that timing of the processes and the size and shape of various elements herein may be modified but still fall within the scope of the present disclosure, although certain timings, one or more shapes and/or sizes, or types of elements, may be advantageous over others.

In general, the present disclosure describes various embodiments of encoder and decoder apparatus that are adapted to transmit and receive transport blocks that include video segments of native video data via an optical transport link. The disclosure herein will use the terms "native video data," "video segment," and "video line." As used herein, it is to be understood that native video data may include video frames including pixel data, horizontal synchronization tags, and vertical synchronization tags. Native video data may be synchronized by a free running clock source that generates a consistent time base for the transmission of data. The atomic unit of video data may be a pixel. A pixel may be assigned a unique color value. Pixels may be transmitted on each "tick," or discrete event, of the clock source. A set of pixels may be generated left to right forming a complete horizontal video line. Horizontal video lines may be sent one after another, top-to-bottom to form a complete video frame. By sending many video frames each second, an observer may interpret these many static video frames, or pictures, as smooth motion video.

As described herein, native video data formats may have a clock source, a set of pixels, and a set of horizontal video lines. Differences in the native video data formats may include the speed of the clock, how many bits define the color of a pixel, how many pixels form a horizontal video line, and how many horizontal video lines "make up" a complete video frame. The illustrative apparatus, systems, and methods described herein can accommodate an arbitrary pixel size, any number of pixels per line, and any number of lines per frame; therefore, the illustrative apparatus, systems, and methods described herein may be described as being capable of handling any native video data format.

Besides pixels, native video data may include horizontal and vertical synchronization tags that mark the end of horizontal video lines and the end of complete video frames. Native video data may be sent over a deterministic, reliable link and it may be assumed that all data transmitted will be received in order and in time. With native video data, there may be no method to decode an arbitrary component within the video. For example, a receiver of native video data may wait for a vertical synchronization tag to occur to determine, or know, when a new frame of video has started. Once the vertical tag has been detected, the receiver may maintain a lock on the original clock source so the receiver can correctly interpret the video data.

Beyond the synchronization tags and pixel data, other products may be included in digital streams of native video data such as, e.g., out-of-band data (e.g., audio data, user or other device input, etc.). The illustrative apparatus, systems, and methods described herein can also transmit and receive such out-of-band data. The out-of-band data may be provided with an indicator that indicates the type of data.

A video line may include as lossless data representative of a horizontally or vertically contiguous line of pixels of a video frame of native video data. A video segment may include lossless data representative of a subset of a single native video frame of native video data arranged in a manner such that the native video can be reconstructed from such video segments. Each video segment may be associated with a segment number. Each segment number may indicate a predetermined location within a frame of native video data for each pixel of the video segment based on the order of the pixels in the video segment. For example, video segments may include a video line. In another example, the video segment may include a series of pixels that are spaced apart every 1920th pixel of the video frame. The segment number may indicate the position of the first pixel of the video segment, and each pixel thereafter is spaced 1920 pixels away from the pixel preceding it. In a still further example, the video segment may represent a rectangular section of pixels of the native video data and the segment number indicates the position of the rectangular segment in the native video frame.

Distribution of digital media content over packet-based distribution systems (including Ethernet) may require high-capacity links and fast switches or advanced compression techniques. Compression techniques may be appropriate when some amount of latency is acceptable to the system. However, some applications may require that latency is kept as close to zero as possible rendering the use of compression inappropriate for such applications. For such low latency (e.g., less than 100 milliseconds delay for audio synchronization, or less than 10 milliseconds delay for input synchronization) applications, networking equipment must offer exceptional capacity. For example, a 4K (e.g., 3840×2160 pixels) 60 Hertz (Hz) digital stream may require at least one dedicated connection with at least 10 gigabits per second (Gbps) of bandwidth. Multiple 4K streams may require additional bandwidth with each leg having 10 Gbps of bandwidth and backbones supporting at least 10 Gbps per connected leg (e.g., 100 Gbps for 10 legs).

To stream content to multiple subscribers simultaneously, traditional distribution systems may use some form of multi-casting to allow more than one subscriber to view the content of a given content generator. In such traditional systems, the multi-casting mechanism may be supported by the content generator, the subscribers, and a switching device. The switching device may operatively couple the content generator and subscribers while directing network traffic (e.g., data transmission) between the content generator and subscribers.

Multi-casting mechanisms may be imposed on traditional media distribution systems because of the limited bandwidth provided by an individual transport link (e.g., network port). Minimally, a single transport link may carry at least one stream of content. When a subscriber wants to listen to a different stream of content, it may have a mechanism to tell or instruct the switching device (e.g., a network switch for Ethernet) that it wants to receive content from a different content generator. Because the transport links of traditional media distribution systems generally lack the capacity to carry all streams simultaneously, the switching device may first stop sending the original content and then connect the new content to the subscriber requesting content from a different content generator.

The apparatus, systems, and methods described herein may eliminate the need for a switching device to direct content traffic in the media distribution system by using wavelength division multiplexing (WDM). Additionally, such apparatus, systems, and methods may simplify tasks required of content generators and subscribers by using wavelength division multiplexing as the transport technology along with optical tuners.

Furthermore, each content generator may be assigned to a different optical channel of a single optical transport link allowing each content stream to be optically combined in the optical transport link using optical multiplexers. For example, a unique International Telecommunications Union (ITU) channel can be assigned to each content generator and each content stream can be optically combined onto a single transmission medium using industry standard ITU multiplexers.

The use of wavelength division multiplexing at the transport link layer may allow the video streams of all connected content generators to be available simultaneously to all connected subscribers. When a subscriber wants to change to a different content generator, it simply needs to "listen" or tune in to the appropriate optical channel. Optical tuners may be used to allow subscribers to tune in or "listen" to various optical channels of the optical transport link. For example, a tunable Small Form-factor Pluggable or Small Form Factor (SFP/SFF) optical transceiver may be used with ITU channel schemes to allow subscribers to tune into various ITU optical channels. By using optical tuners or tunable transceivers, the subscriber may no longer need to tell a switching device to send a different stream. Instead, the subscriber may simply, and independently from the content generator, adjust its optical tuner to a desired channel.

Advantageously, the apparatus, systems, and methods described herein that use wavelength division multiplexing may reduce a cable count of a transport link for media distribution from C+L to 1, where C is the number of content generators and L is the number of subscribers. Furthermore, the utilization of the transport link may be increased to the bandwidth required by the video stream times the number of content generators. Still further, the need for a switching device and/or multi-casting mechanisms may be eliminated.

Additionally, each content generator may be assigned a return path on the optical transport link to receive data (e.g., transport blocks). The return path for a content generator may be included in the optical channel assigned to the content generator or may be another optical channel assigned to the generator as a return path. The return path may be used by content generators to receive transport blocks from any subscriber operatively coupled to the optical transport link. Accordingly, each content generator can simultaneously transmit and receive transport blocks via their assigned optical channel or channels. In other words, the optical channels described herein may allow the content generators to receive return-path transport blocks while simultaneously streaming media content (e.g., transmitting transport blocks that include a video segment of a video frame of native video data). Return-path transport blocks may include data generated by a subscriber and transmitted to a content generator on the content generator's return path.

When only one subscriber is listening to a content generator, the transport blocks sent from the subscriber will be delivered to the content generator as part of a standard WDM implementation via the return path. However, when multiple subscribers are listening to a single content generator and two or more of the subscribers transmit return-path transport blocks that overlap, such overlapping return-path transport blocks may destroy or corrupt each other. Although not limited to return-path transport blocks, transport blocks transmitted simultaneously (e.g., the transport block transmission times at least partially overlap) on the same return path may destroy or corrupt each other because standard WDM implementations lack a mechanism to arbitrate between simultaneous transmissions within the same wavelength or frequency space (e.g., return path or optical channel). Accordingly, the overlapping portions of the optical waves of the simultaneous transmissions may distort each other causing the transport blocks to be destroyed or corrupted.

To address this potential conflict, subscribers may retransmit a return-path transport block until an acknowledgement transport block is received that corresponds to the return-path transport block. Content generators may transmit an acknowledgement transport block in response to the receipt of a return-path transport block. Such acknowledgement transport blocks may be received by every subscriber listening to a given content generator. To allow a subscriber to determine that the acknowledgement transport block corresponds to the return-path transport block sent by that subscriber, the return-path transport block and the acknowledgement transport block may each include the same source address. In other words, a return-path transport block may include a source address and the source address may correspond to a source address assigned to the subscriber that generated the return-path transport block. Furthermore, the acknowledgement transport block sent in response to receipt of the return-path transport block may include the source address included in the return-path transport block. Accordingly, when a subscriber receives an acknowledgement transport block, the subscriber can determine whether a return-path transport block transmitted by the subscriber was received by the content generator based on the source address included in the acknowledgement transport block. For example, if a subscriber does not receive an acknowledgement transport block that includes a source address that matches an address assigned to the subscriber after transmitting a return-path transport block, the subscriber may retransmit the return-path transport block. However, if an acknowledgement transport block is received by the subscriber after transmission of the return-path transport block, the subscriber may not retransmit the return-path transport block or may cease retransmitting the return-path transport block.

The invention is defined in the claims. However, below there is provided a non-exhaustive list of non-limiting examples. Any one or more of the features of these examples may be combined with any one or more features of another example, embodiment, or aspect described herein.

Example Ex1: An encoder apparatus comprising an encoder input to receive at least native video data; an encoder transceiver to transmit and receive transport blocks via an optical transport link defining a plurality of optical channels using wavelength division multiplexing; and processing circuitry operatively coupled to the encoder input and the encoder transceiver and configured to receive a video frame of native video data from the encoder input; generate a transport block comprising a video segment of the video frame; and transmit the transport block comprising the video segment on an optical channel assigned to the encoder apparatus using the encoder transceiver.

Example Ex2: The apparatus as in any one of the previous examples, wherein the encoder transceiver comprises an optical multiplexer.

Example Ex3: The apparatus as in any one of the previous examples, wherein the processing circuitry is further configured to receive a return-path transport block via the encoder transceiver comprising a source address;
generate an acknowledgement transport block that comprises the source address; and transmit the acknowledgement transport block on the optical channel using the encoder transceiver.

Example Ex4: The apparatus as in any one of the previous examples, wherein the video segment comprises at least a portion of a video line.

Example Ex5: The apparatus as in any one of the previous examples, wherein the video segment comprises a horizontal video line.

Example Ex6: The apparatus as in any one of the previous examples, wherein the generated frame further comprises a video segment number that indicates a position of the video segment in the frame of the native video data.

Example Ex7: The apparatus as in any one of the previous examples, wherein the processing circuitry is further configured to receive user input data and/or sound data from the encoder input; generate a transport block comprising at least a portion of the user input and/or sound data and an out-of-band segment number that indicates a type of the input and/or sound data; and transmit the transport block comprising the input and/or sound data.

Example Ex8: A decoder apparatus comprising a decoder transceiver to receive and transmit transport blocks via an optical transport link defining a plurality of optical channels using wavelength division multiplexing; a decoder output to transmit at least native video data; and processing circuitry operatively coupled to the decoder transceiver and the decoder output and configured to receive transport blocks from one of the plurality of optical channels using the decoder transceiver, each transport block comprising a video segment of a video frame of native video data; reconstruct the native video data based on the received transport blocks; and transmit the native video data using the decoder output.

Example Ex9: The apparatus as in example Ex8, wherein the decoder transceiver comprises an optical demultiplexer.

Example Ex10: The apparatus as in any one of examples Ex8 or Ex9, further comprising an optical tuner to select between the plurality of optical channels.

Example Ex11: The apparatus as in any one of examples Ex8 to Ex10, wherein the processing circuitry is further configured to generate a return-path transport block comprising a source address and an input command; and transmit the return-path transport block via the optical transport link using the decoder transceiver.

Example Ex12: The apparatus as in example Ex11, wherein the processing circuitry is further configured to retransmit the return-path transport block in response to a predetermined period of time elapsing without receipt of an acknowledgement transport block comprising the source address.

Example Ex13: The apparatus as in example Ex11, wherein the processing circuitry is further configured to receive an acknowledgement transport block comprising the source address; and cease transmitting the return-path transport block.

Example Ex14: The apparatus as in any one of examples Ex8 to Ex13, wherein, to reconstruct the video frame of the native video data, the processing circuitry is further configured to place each video segment of a single video frame in a video frame buffer.

Example Ex15: The apparatus as in any one of examples Ex8 to Ex14, wherein each transport block further comprises a video segment number corresponding to a position of the video segment in the video frame and the native video data is reconstructed based on at least the video segment number of each transport block.

Example Ex16: The apparatus as in any one of examples Ex8 to Ex15, wherein the processing circuitry is further configured to receive at least one transport block comprising user input and/or sound data and an out-of-band segment number; determine a type of data based on the out-of-band segment number; and transmit the input and/or audio data based on the determined type of data using the decoder output.

Example Ex17: A system comprising an optical transport link defining a plurality of optical channels; and a plurality of nodes, each node of the plurality of nodes operatively coupled to the optical transport link, the plurality of nodes comprising one or more encoder apparatus, each of the one or more encoder apparatus comprising an input to receive at least native video data; an encoder transceiver to transmit and receive transport blocks via the optical transport link using wavelength division multiplexing; and encoder processing circuitry operatively coupled to the input and the encoder transceiver and configured to receive native video data comprising at least a video frame from the input; generate transport blocks, each transport block comprising a video segment of the video frame; and transmit the transport blocks on an optical channel assigned to the one or more encoder apparatus using the encoder transceiver; and one or more decoder apparatus, each of the one or more decoder apparatus comprising a decoder transceiver to receive and transmit transport blocks via the optical transport link using wavelength division multiplexing; a decoder output to transmit at least native video data; and decoder processing circuitry operatively coupled to the decoder transceiver and the output and configured to receive the transmitted transport blocks from one of the plurality of optical channels using the decoder transceiver; reconstruct the native video data based on the received transport blocks; and transmit the reconstructed native video data using the decoder output.

Example Ex18: The system as in example Ex17, wherein the one or more encoder apparatus comprises a first encoder apparatus and a second encoder apparatus, and wherein each of the one or more decoder apparatus further includes an optical tuner to allow a user to switch between receiving transport blocks on the optical channel assigned to the first encoder apparatus or the optical channel assigned to the second encoder apparatus and outputting native video data based on the transport blocks received from the first encoder apparatus or the second encoder apparatus.

Example Ex19: The system as in any one of examples Ex17 or Ex18, wherein the transport blocks are transmitted and received without the use of a network switch.

Example Ex20: The system as in any one of examples Ex17 to Ex19, wherein one of the plurality of nodes is configured to assign the optical channel to the one or more encoder apparatus.

Figure 2:
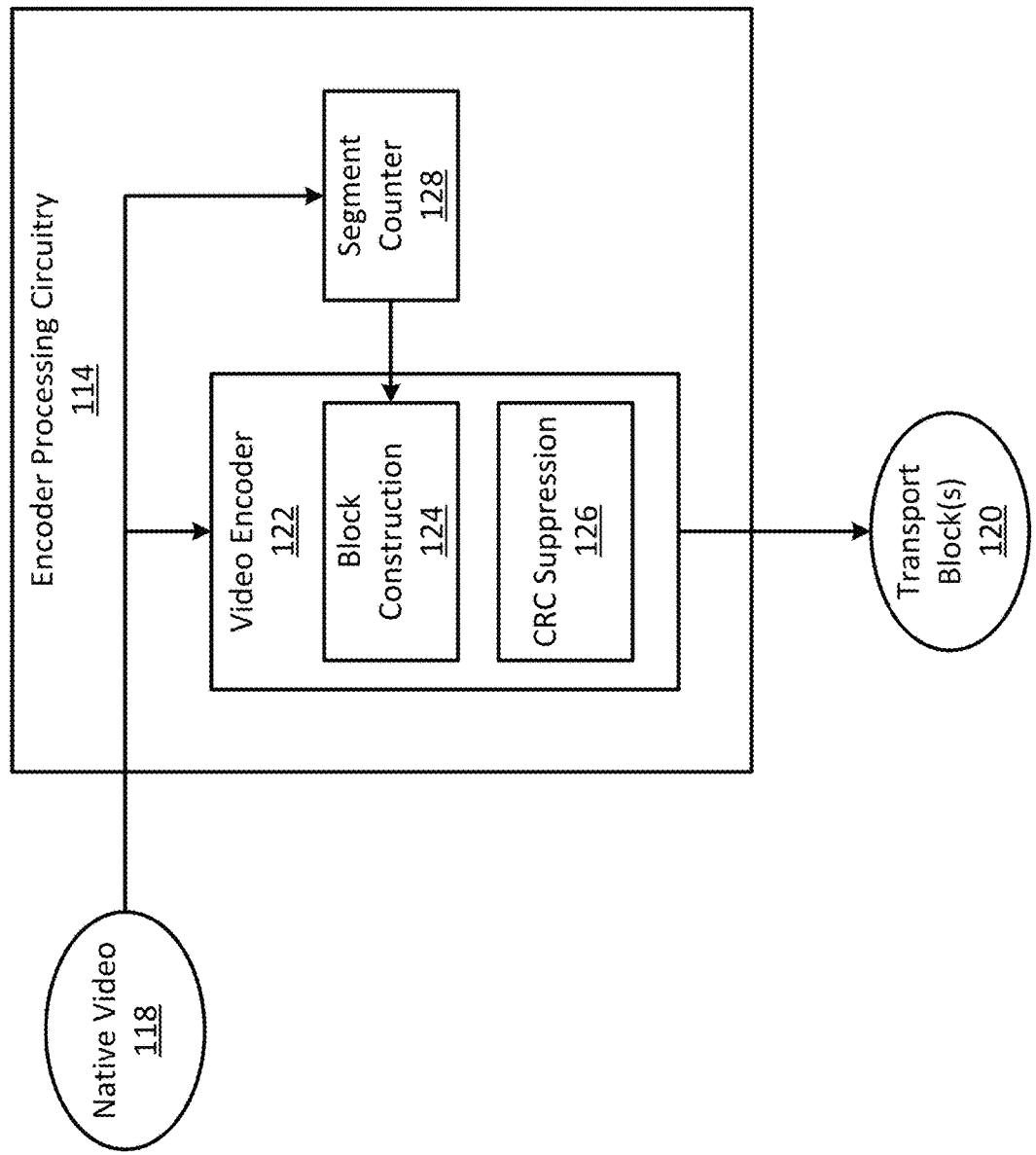
FIG. 2 is a schematic diagram of encoder processing circuitry of the encoder apparatus of FIG. 1.
Figure 3:
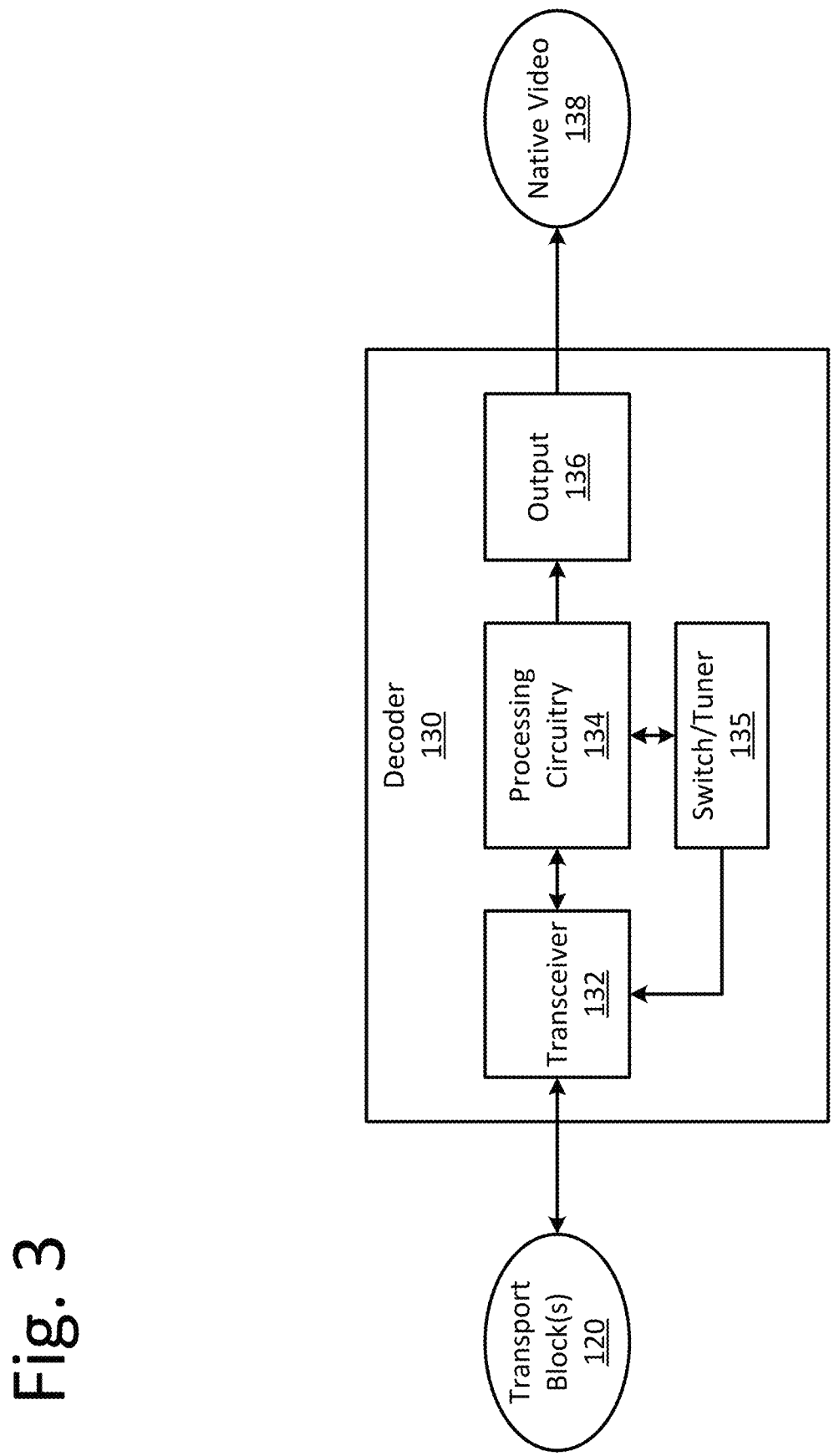
FIG. 3 is a schematic diagram of a decoder apparatus according to one embodiment for use with the illustrative systems, apparatus, and methods described herein.
Figure 4:
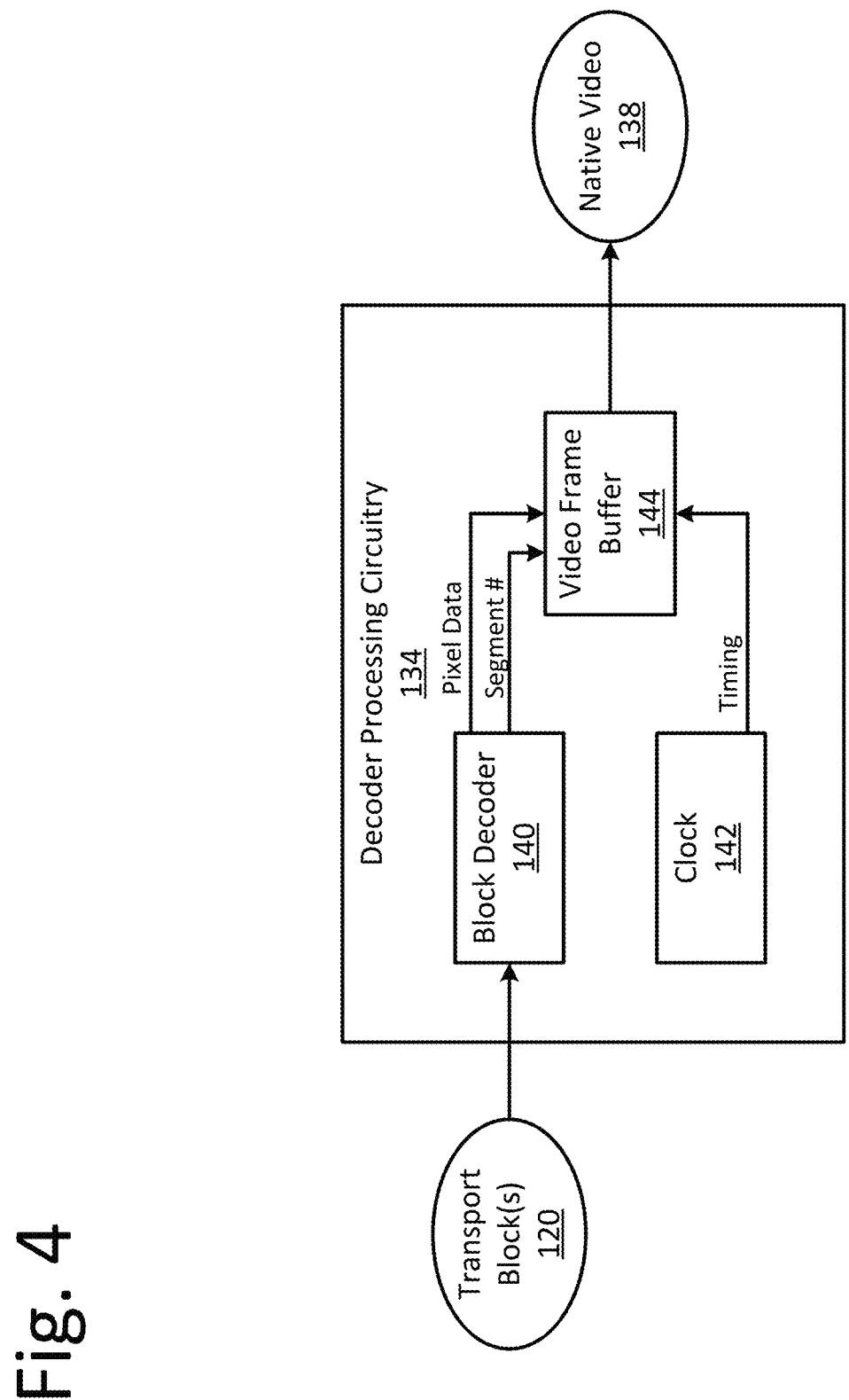
FIG. 4 is a schematic diagram of the decoder processing circuitry of the decoder apparatus of FIG. 3.

To facilitate media streaming using WDM, each content generator may include an encoder apparatus and each subscriber may include a decoder apparatus. An exemplary encoder apparatus is depicted in FIGS. 1 and 2 while an exemplary decoder apparatus is depicted in FIGS. 3 and 4.

An exemplary encoder apparatus 110 for generating transport blocks 120, each transport block including a video segment of a video frame of native video data 118, is depicted in FIG. 1. The encoder apparatus 110 may include an encoder input 112, processing circuitry 114, and an encoder transceiver 116. The encoder input 112 may be configured to, or adapted to, receive native video data 118. The encoder input 112 may include any suitable connector or interface for receiving native video data 118 such as, e.g., Video Graphics Array (VGA), RS-343A, High-Definition Multimedia Interface (HDMI), Digital Visual Interface (DVI), DisplayPort (DP), carried as DisplayPort protocol over USB 3.0, 3.1, National Television Standard Committee (NTSC)-RS170, etc. The encoder input 112, may be operatively coupled to and receive native video data from any suitable source such as, e.g., a computer, a video camera, a live video feed, sensor video products, etc. Additionally, the encoder input 112 may be operatively coupled to any other suitable device to receive non-video data such as, e.g., a computer mouse, a keyboard, a universal serial bus (USB) device, a microphone, or any input device that provides a digital discrete signaling levels (e.g., selector switch or security switch, status indicators, etc.). The encoder input may receive non-video or out-of-band data such as, e.g., input and/or sound data. Further, the encoder input 112 may be operatively coupled to the processing circuitry 114 to provide the received native video data and/or out-of-band data to the processing circuitry 114.

The processing circuitry 114 may receive one or more video frames of the native video data from the encoder input 112. Once a video frame, or portion thereof, has been received, the processing circuitry 114 may generate a plurality of transport blocks 120, each transport block including a video segment of the received video frame or portion until the entire video frame has been packaged into video segments within the transport blocks 120. The processing circuitry 114 may be operatively coupled to the encoder transceiver 116 to provide transport blocks to the encoder transceiver 116. Thus, after each transport block 120 has been generated, the processing circuitry 114 may transmit the transport block using the encoder transceiver 116.

The processing circuitry 114 may include any suitable hardware or devices to read video data, generate transport blocks 120, convert video data formats, count video segments, generate video segment lines, determine out-of-band data types, package and encode the native video data 118 or out-of-band data into an appropriate payload for the transport blocks, accept and act on configuration parameters that control the generation of the transport blocks, etc. The processing circuitry 114 may include, e.g., one or more processors, logic gates, clocks, queues and First-In-First-Out (FIFO) for holding intermediate data packages, Electro-Static Discharge (ESD) protection circuitry for input and output signals, line drivers and line receivers for interfacing to external devices, etc. The processing circuitry 114 may be provided in a Field-Programmable Gate Array (FPGA), a circuit board, a system on a chip, a fixed or mobile computer system (e.g., a personal computer or minicomputer), implemented in software, etc. In one example, processing circuitry 114 is implemented in an FPGA.

The exact configuration of the processing circuitry 114 is not limiting and essentially any device capable of providing suitable computing capabilities and video signal processing capabilities (e.g., read video data, generate transport blocks 120, convert video data formats, etc.) may be used. Further, various peripheral devices, such as a computer display, mouse, keyboard, memory, printer, scanner, etc. are contemplated to be used in combination with the processing circuitry 114 or encoder apparatus 110. Further, in one or more embodiments, data (e.g., native video data, video segments, video lines, out-of-band data, synchronization tags, etc.) may be analyzed by a user, used by another machine that provides output based thereon, etc. As described herein, a digital file may be any medium (e.g., volatile or non-volatile memory, a CD-ROM, a punch card, magnetic recordable tape, etc.) containing digital bits (e.g., encoded in binary, trinary, etc.) that may be readable and/or writeable by processing circuitry 114 described herein. Also, as described herein, a file in user-readable format may be any representation of data (e.g., ASCII text, binary numbers, hexadecimal numbers, decimal numbers, audio, graphical) presentable on any medium (e.g., paper, a display, sound waves, etc.) readable and/or understandable by a user.

In view of the above, it will be readily apparent that the functionality as described in one or more embodiments according to the present disclosure may be implemented in any manner as would be known to one skilled in the art. As such, the computer language, the computer system, or any other software/hardware that is to be used to implement the processes described herein shall not be limiting on the scope of the systems, processes, or programs (e.g., the functionality provided by such systems, processes, or programs) described herein.

The methods and processes described in this disclosure, including those attributed to the systems, or various constituent components, may be implemented, at least in part, in hardware, software, firmware, or any combination thereof. For example, various aspects of the techniques may be implemented by the processing circuitry 114, which may use one or more processors such as, e.g., one or more microprocessors, DSPs, ASICs, FPGAs, CPLDs, microcontrollers, or any other equivalent integrated or discrete logic circuitry, as well as any combinations of such components, image processing devices, or other devices. The term "processing apparatus," "processor," or "processing circuitry" may generally refer to any of the foregoing logic circuitry, alone or in combination with other logic circuitry, or any other equivalent circuitry. Additionally, the use of the word "processor" may not be limited to the use of a single processor but is intended to connote that at least one processor may be used to perform the exemplary methods and processes described herein.

Such hardware, software, and/or firmware may be implemented within the same device or within separate devices to support the various operations and functions described in this disclosure. In addition, any of the described components may be implemented together or separately as discrete but interoperable logic devices. Depiction of different features, e.g., using block diagrams, etc., is intended to highlight different functional aspects and does not necessarily imply that such features must be realized by separate hardware or software components. Rather, functionality may be performed by separate hardware or software components, or integrated within common or separate hardware or software components.

When implemented in software, the functionality ascribed to the systems, devices and methods described in this disclosure may be embodied as instructions on a computer-readable medium such as RAM, ROM, NVRAM, EEPROM, FLASH memory, magnetic data storage media, optical data storage media, or the like. The instructions may be executed by the processing circuitry 114 to support one or more aspects of the functionality described in this disclosure.

The processing circuitry 114 may be further described as being configured to receive any native video data 118 stream and to generate and transmit transport blocks 120 including data representative of the native video data 118. Each transport block 120 generated by processing circuitry 114 may include a video segment that represents a portion of a video frame of the native video data 118. Video segments may include lossless pixel data. As used herein, lossless indicates data representation, compression, and/or conversion where no information about the original pixel of the native video data 118 is lost. In one example, the native video data 118 is encoded in the red-green-blue (RGB) color space. transport blocks may have the raw capacity to carry native digital video products. For example, a native video data stream with a resolution of 3840 pixels by 2160 lines with 32-bit pixels updating 60 times a second may generate 3840*2160*4*60=2 gigabytes (16 gigabits) of data per second which may be within the capacity of 25 gigabit Ethernet. Reducing the pixel size (color depth) from 32 bits to 16 bits may drop the bandwidth need to 8 gigabit which fits on existing 10 gigabit bandwidths.

Reducing the color depth from 32 bits to 16 bits may not impact the original image quality. Although many native video content generators allocate 32 bits (4 bytes) to each pixel, only 3 of those bytes may typically carry color and intensity information; one byte each for the red, green, and blue primary colors that defines the pixel. The 4th byte may often be used to store overlay information that is not part of the original video image. A further reduction from this actual 24-bit pixel data to 16 bits can be accomplished by using other color space encodings. The 24-bit RGB encoding may merge color information along with intensity (brightness) information across each of the 3 bytes of the primary colors that defines the pixel. In one sense, the intensity information is replicated three times, once for each of the red, green, and blue values. By separating the intensity data from the color data, a reduction to 2 bytes per pixel may be possible. This may be known as intensity-chrominance encoding scheme (Crib). The intensity field may describe the raw brightness of the pixel, then the remaining data may describe the ratio of red and blue color. The amount of green may be derived by the difference in intensity from the red and blue ratios. Although the color space can be set to accommodate different transport block capacities, methods, apparatus, and systems described herein may be color space agnostic.

When the processing circuitry 114 generates the transport block 120, the video segment of the transport block may include chrominance- and luminance-encoded pixel data. Chrominance and luminance encoding may also be known as intensity-chrominance encoding. The intensity or luminance indicates the brightness of a pixel and the chrominance indicates the ratio of red and blue color of the pixel. The amount of green in the pixel can be derived from the difference between the intensity of the pixel and the red and blue ratio of the pixel. Using chrominance and luminance encoding may allow the pixel data to be represented using less data than RGB encoding without losing any information about the pixels. In other words, chrominance and luminance encoding may be described as a form of lossless pixel data encoding.

The encoder transceiver 116 may transmit and receive transport blocks 120 via an optical transport link using WDM. The optical transport link may define a plurality of optical channels. The encoder transceiver 116 may include any suitable device or devices to transmit and receive data (e.g., transport blocks) via an optical transport link using WDM. For example, the encoder transceiver 116 may include an optical multiplexer and/or an optical demultiplexer. An optical multiplexer can combine optical signals for transmission on an optical transport link and an optical demultiplexer can separate optical signals received from the optical transport link. In one or more embodiments, the encoder transceiver 116 may include a bidirectional optical multiplexer. Bidirectional optical multiplexers can include the functionality of both an optical multiplexer and an optical demultiplexer. In other words, bidirectional optical multiplexers can combine optical signals for transmission on an optical transport link and separate optical signals received from the optical transport link.

The encoder transceiver 116 may include any suitable connector or interface for transmitting and receiving transport blocks or other data via an optical transport link. For example, the encoder transceiver 116 may include expanded beam connectors, physical contact connectors, Multi-fiber Push On (MPO) connectors, Fiber Distributed Data Interface, Straight Tip (ST) connectors, etc. The encoder transceiver 116 may transmit the transport blocks 120 to any device operatively coupled to the same optical transport link as the encoder transceiver 116. Packaging the video segments into transport blocks may allow real-time transmission of video data from any operatively coupled source to any operatively coupled destination without regard to the native video data 118 format or the destination video data format.

Additionally, the encoder transceiver 116 may receive other of the transport blocks 120 (e.g., return-path transport blocks) from any device operatively coupled to the same optical transport link as the encoder transceiver 116. Return-path transport blocks may include input data from a subscriber and/or decoder apparatus. The processing circuitry 114 may receive a return-path transport block via the encoder transceiver 116. The return-path transport block may include a source address. The source address may be associated with a source node (e.g., decoder apparatus and/or subscriber) that generated and/or transmitted the return-path transport block. In response to the receipt of a return-path transport block, the processing circuitry 114 may generate an acknowledgement transport block that includes the source address included in the return-path transport block and transmit the acknowledgement transport block on the optical channel assigned to the encoder apparatus 110 using the encoder transceiver 116. By including the source address in the acknowledgement transport block, the source node can be notified or receive confirmation that the return-path transport block was received.

In some examples, the encoder input 112 may be configured to receive out-of-band data such as, e.g., input and/or sound data. The processing circuitry 114 may be configured to generate a transport block including at least a portion of the out-of-band data. Additionally, the processing circuitry 114 may be configured to generate the transport block further including an out-of-band segment number that indicates a type of the input and/or sound data. Out-of-band segment numbers are segment numbers that do not indicate a position of a video segment within a video frame but instead indicate order of the out-of-band data. Out-of-band segment numbers may include, e.g., negative numbers, numbers exceeding a threshold number, or any other number that does not indicate a position of a video segment within a video frame.

Exemplary encoder processing circuitry 114 for generating transport blocks 120 including a video segment of a video frame of native video data 118 is depicted in FIG. 2. Encoder processing circuitry 114 may include a video encoder 122 and a segment counter 128. The video encoder 122 may include block construction circuitry 124 and cyclic redundancy check (CRC) suppression circuitry 126. The native video data 118 may be received by the video encoder 122 and the segment counter 128.

The segment counter 128 may be configured to provide a segment number to the block construction circuitry 124 during transport block generation. The provided segment number may be based on the position of the video segment position in a video frame of native video data 118. For example, if the video segment is a horizontal video line, the segment number may indicate which horizontal video line within a video frame the video segment represents. The video encoder 122 may generate a transport block 120 including a video segment and the segment number provided by the segment counter 128. In some examples, the video encoder 122 is configured to generate a video segment that includes at least a portion of a video line. A video line may be a contiguous line of pixels of a video frame. In at least one example, the video line may be a horizontal video line. In other examples, the video line may be a vertical video line. In one example, the video encoder 122 converts the pixel data of the native video to chrominance- and luminance-encoded pixel data to generate a video segment.

In general, native video data streams (e.g., native video data 118) may be assumed to be deterministic (e.g., transmission time is consistent, based on a clock source, etc.), reliable (all data sent will be received), and lossless (no reduction in data fidelity). While transmissions via optical transport links may be deterministic, they may not be theoretically lossless or completely reliable. However, the bit-error-rate of transmissions via optical transport links is so low (e.g., $10^{-12}$) and the lifespan of the data of such transmission is so short (e.g., 16 milliseconds), that transmissions via optical transport link may be effectively lossless and reliable. In application that require truly lossless and reliable transmissions, a retransmission protocol can be utilized coupled with cyclic redundancy checks (CRCs) so that errors can be detected and transport blocks containing such errors can be retransmitted. Optical transport links as described herein can be implemented without switches, routers, or protocols that can cause the transport blocks 120 to arrive out of order. Instead, transport blocks 120 may transmitted via the optical transport link may arrive at devices coupled to the optical transport link in the order transmitted by the encoder transceiver 116 because the optical transport link provides a single path for all transport blocks 120. Accordingly, transport blocks 120 can be transmitted via optical transport links without the segment number.

In contrast, protocols that utilize switches or routers, e.g., Ethernet protocols, may be neither deterministic nor inherently reliable. Using such protocols, the transport blocks 120 may be duplicated and transmitted via different links and/or data paths. Thus, it may not be possible to guarantee the delivery order of transport blocks 120 using protocols that rely on switches or routers. While transport blocks 120 transmitted via optical transport links as described herein may arrive in sequence order to devices coupled to the optical transport link, networks or devices that utilize non-deterministic protocols can also be coupled to optical transport links.

To address the out-of-order problem on networks and devices outside of the optical transport link, each of transport blocks 120 may include a segment number that identifies the position of the video segment position in a video frame of native video data 118. The segment number may ensure the video frame can be reassembled in the correct order even if the transport blocks 120 are received out-of-order. By encoding a video segment within a transport block (e.g., transport blocks 120), it may be possible to maintain the relative placement of pixels within a video frame regardless of the various networks the transport block is transmitted on. Additionally, such protocols may ensure there is no loss of content, thereby providing a lossless protocol.

Adding segment numbers may partially solve the segment level determinism issue. To completely solve the determinism issue for segment lines, the bandwidth of the encoder apparatus 110 of FIG. 1 may be slightly larger than the native video data bandwidth requirement. For example, if the native video generates 8 Gigabits of data per second, the encoder output may have slightly more than 8 Gigabit of bandwidth such as, e.g., 10 Gigabits. The processing circuitry 114 may add a small amount of overhead (e.g., a header) to the video data when transport blocks 120 are generated. Accordingly, bandwidth in excess of the native video requirements can accommodate the additional data included in transport blocks 120.

Although not required for transmission of transport blocks 120 via optical transport links, transport blocks 120 may include a Cyclic Redundancy Check (CRC) checksum to be Ethernet compatible. The video encoder 122 may suppress CRCs using CRC suppression circuitry 126. In one example, the CRC is suppressed by setting a CRC checksum of the generated transport block to zero. Typically, transport blocks may include and be protected by CRCs to address reliability issues in various protocols, e.g., Ethernet protocols. For example, CRCs may ensure any corruption of transport blocks will be detected and any transport block with any amount of corruption may be discarded, including transport blocks with a single bit error. This approach may ensure that data that arrives is correct, but it may not ensure the data set is complete. Such an approach may not be compatible with native video transports. When native video data is corrupted, the bad video data may be passed on and assumed good because there may not be a method to detect errors in native video transports. Because pixels have a short life span (e.g., 16 milliseconds) it may be deemed better to display a bad pixel than incur the overhead to detect and correct any errors. Adapting transport blocks to this philosophy may mean removing the CRC. With the CRC removed, the transport block will be passed on without checking for errors. Because transport blocks are well formed (e.g., the layout and structure is known ahead of time), it may be possible to detect and correct many errors that would affect the transport block header information (e.g., length, data type, routing information). Any errors that occur in the payload (e.g., pixel data) may be processed without error detection or correction like native video data. The relative sizes of the transport block header to the transport block payload means that it is statistically far more likely that data corruption will affect the payload which may be deemed acceptable.

The generated transport block 120 may optionally include a destination address. In other words, a destination address may not be needed to provide or deliver content streams to decoder apparatus or receivers using optical transport links. However, the destination address of the generated transport block 120 may still be utilized in some embodiments. The destination address may include any suitable address type such as, e.g., a direct address, a multicast address, or a broadcast address. In at least one embodiment, the transport block 120 includes a multicast address. The destination address may be used to optionally provide transport blocks compatible with protocols that support packet switching, e.g., Ethernet protocols. When protocols that support packet switching are not required, the destination address of the transport block 120 may refer to one or more of the channels defined by an optical transport link.

An exemplary decoder apparatus 130 to reconstruct native video data 138 based on received transport blocks 120 is depicted in FIG. 3. As depicted in FIG. 3, native video data 138 may represent reconstructed native video (e.g., native video data 118 of FIGS. 1 and 2). Reconstructed native video data 138 may have slight or negligible differences from original native video data when CRCs and other data integrity checks are suppressed or disabled.

The decoder apparatus 130 may include a decoder transceiver 132, processing circuitry 134, switch 135, and decoder output 136. The decoder transceiver 132 may include any suitable device or devices to transmit and receive data (e.g., transport blocks) via an optical transport link using WDM. For example, the decoder transceiver 132 may include an optical multiplexer and/or an optical demultiplexer. An optical multiplexer can combine optical signals for transmission on an optical transport link and an optical demultiplexer can separate optical signals received from the optical transport link. In one or more embodiments, the decoder transceiver 132 may include a bidirectional optical multiplexer. Bidirectional optical multiplexers can include the functionality of both an optical multiplexer and an optical demultiplexer. In other words, bidirectional optical multiplexers can combine optical signals for transmission on an optical transport link and separate optical signals received from the optical transport link.

The decoder transceiver 132 may include any suitable connector or interface for transmitting and receiving transport blocks or other data via an optical transport link. For example, the decoder transceiver 132 may include expanded beam connectors, physical contact connectors, Multi-fiber Push On (MPO) connectors, Fiber Distributed Data Interface, Straight Tip (ST) connectors, etc. The decoder transceiver 132 may be operatively coupled to any suitable device, e.g., a network, a computer, a switch, a decoder device, a network bridging device, a range extender, etc. The processing circuitry 134 may receive one or more transport blocks 120 from the decoder transceiver 132. Once one or more transport blocks 120 including video data have been received, the processing circuitry 134 may reconstruct native video data 138 based on the received transport blocks. After the native video data 138 has been reconstructed, the processing circuitry 134 may transmit the native video data using the decoder output 136 to an output device (e.g., a monitor, a television, etc.). The processing circuitry 134 may include any suitable hardware or devices to reconstruct the native video data 138. The processing circuitry 134 may include, e.g., one or more processors, logic gates, clocks, buffers, memory, decoders, queues and First-In-First-Out (FIFO) for holding intermediate data packages, Electro-Static Discharge (ESD) protection circuitry for input and output signals, line drivers and line receivers for interfacing to external devices, etc. The processing circuitry 134 may be provided in a Field-Programmable Gate Array (FPGA), a circuit board, a system on a chip, a computer, implemented with software, etc. In one example, processing circuitry 134 is implemented in an FPGA. In other words, chrominance and luminance encoding is a form of lossless pixel data encoding. The exact configuration of the processing circuitry 134 is not limiting and may be similar to configurations previously discussed herein with respect to the processing circuitry 114 of FIG. 1.

Thus, the processing circuitry 134 may be configured to receive transport blocks 120 and to reconstruct and transmit native video data 138. Each transport block 120 received by processing circuitry 134 may include a video segment that represents a portion of a video frame of native video data 138. Video segments may include lossless pixel data. As used herein, "lossless" indicates data representation, compression, and/or conversion wherein no information about the original pixel of the native video data 118 is lost. In some examples, the video segments of the transport blocks 120 may include chrominance- and luminance-encoded pixel data. Chrominance and luminance encoding may also be known as intensity-chrominance encoding. The intensity or luminance indicates the brightness of a pixel and the chrominance indicates the ratio of red and blue color of the pixel. The intensity or luminance value of the pixel may be stored in one byte of data and the chrominance value of the pixel may be stored in another byte of data. The amount of green in the pixel can be derived from the difference between the intensity of the pixel and the red and blue ratio of the pixel. Using chrominance and luminance encoding allows the pixel data to be represented using less data than RGB encoding, which uses three bytes of data, without losing any information about the pixels.

As described herein, the decoder apparatus 130 may further include a switch and/or optical tuner 135 operatively coupled to processing circuitry 134 to allow a user to select between native video data sources that decoder apparatus 130 is operatively coupled to. For example, a plurality of native video data streams may be transmitted via the optical transport link and the decoder apparatus 130 may switch between the plurality of native video data streams using the switch 135. To switch between the plurality of native video data streams, the decoder apparatus 130 may be configured to listen to an optical channel defined by the optical transport link that a selected video stream is transmitted on. In other words, the decoder transceiver 132 may be instructed to provide data (e.g., transport blocks 120) to the processing circuitry 134 from the optical channel that corresponds to the selected video stream. The switch 135 may include any suitable device such as, e.g., a toggle, button, knob, USB device, optical tuner, etc. Further, the switch 135 may be implemented using a combination of software and hardware. For example, software may reside on a user's computer that is operatively coupled to the decoder apparatus 130, and such software may be used to control the switch 135. An optical tuner of the switch 135 may be configured to control an optical demultiplexer of the decoder transceiver to receive data from a selected optical channel. Accordingly, once an optical channel is selected using the switch 135, the optical tuner may control the optical demultiplexer to receive transport blocks from the selected optical channel.

The decoder output 136 may include any suitable connector or interface for receiving and transmitting native video data 118, e.g., Video Graphics Array (VGA), RS-343, High-Definition Multimedia Interface (HDMI), Digital Visual Interface (DVI), a DisplayPort (DP), carried as DisplayPort protocol over USB 3.0, 3.1, National Television Standard Committee (NTSC)—RS170, etc. The decoder output 136, may be operatively coupled to and receive native video data from processing circuitry 134. Additionally, the decoder output 136 may be operatively coupled to any other suitable device to provide native video data 118 such as, e.g., a computer, a monitor, a television, projection screen, other video transmission device, etc. Furthermore, the decoder output 136 may receive and provide non-video or out-of-band data such as, e.g., input and/or sound data. The decoder output 136 may be operatively coupled to any other suitable device to provide out-of-band data such as, e.g., a computer, a speaker, indicator lights, USB device, etc. For example, the decoder output 136 may include a USB port to provide out-of-band input data and/or a 3.5 mm audio jack to provide audio data. In other words, the decoder output 136 may provide the received native video data and/or out-of-band data to any operatively coupled devices, and the decoder output 136 may include any interface to do so.

In some examples, the decoder transceiver 132 may be configured to receive transport blocks 120 that include out-of-band data (e.g., input and/or sound data) and out-of-band segment numbers. The processing circuitry 134 may be configured to determine a type of the out-of-band data based on the out-of-band segment number. Additionally, the processing circuitry 134 may be configured to transmit the out-of-band data based on the determined type of data using the decoder output 136. Out-of-band segment numbers are segment numbers that do not indicate a position of a video segment within a video frame. Out-of-band segment numbers may include, e.g., negative numbers, numbers exceeding a threshold number, or any other number that does not indicate a position of a video segment within a video frame.

In some examples, the decoder processing circuitry 134 may be configured to generate a return-path transport block and transmit the return-path transport block via the optical transport link using the decoder transceiver 132. The return-path transport block may include a source address of the decoder apparatus 130. The source address may be an address associated with the decoder apparatus 130. Additionally, the return-path transport block may include an input command (e.g., out-of-band data). The decoder processing circuitry 134 may be configured to retransmit the return-path transport block after a wait time has elapsed from the transmission or retransmission of the return-path transport block unless an acknowledgement transport block that includes the source address is received. In other words, the decoder processing circuitry 134 may be configured to periodically retransmit the return-path transport block until an acknowledgement transport block corresponding to the return-path transport block is received. The wait time may be within a range of no less than 16 milliseconds to no greater than 100 milliseconds.

The processing circuitry 134 may be configured to adjust the wait time after each retransmission of the return-path transport block. Furthermore, the processing circuitry 134 may be configured to randomly adjust the wait time within a predetermined range (e.g., no less than 16 milliseconds and no greater than 100 milliseconds). By adjusting the wait time after each retransmission of the return-path transport block, indefinitely repeated destruction or corruption of return-path transport blocks may be avoided. For example, if multiple decoder apparatus transmit return-path transport blocks on the same optical channel simultaneously, such return-path transport blocks may be destroyed or corrupted. Accordingly, no acknowledgement transport blocks will be sent or received and each of the multiple decoder apparatus may retransmit the return-path transport blocks. If the wait time for each of the multiple decoder apparatus is the same, each time the return-path blocks are retransmitted by the multiple decoder apparatus the return-path blocks will be destroyed or corrupted because they will be transmitted on the same optical channel at the same time. However, if the wait times of each decoder apparatus are adjusted in a manner that allows the decoder apparatus to have differing wait times (e.g., randomly or in different increments/decrements from one another), then the return-path blocks can be retransmitted without being destroyed or corrupted. Alternatively, each decoder apparatus may be assigned a different wait time.

Exemplary decoder processing circuitry 134 for reconstructing native video data 138 from transport blocks 120 including video segments is depicted in FIG. 4. The decoder processing circuitry 134 may include a block decoder 140, a clock 142, and a video frame buffer 144. Transport blocks may be received by the block decoder 140 of the processing circuitry 134 via the decoder transceiver 132 as shown in FIG. 3.

The block decoder 140 may extract pixel data from the video segments of the transport blocks and place the pixel data in the video frame buffer 144 based on the accompanying, or associated, segment numbers. The segment numbers may indicate the position of the accompanying, or associated, video segment within a video frame and/or the video frame buffer 144. The clock 142 may be used to control reading and/or transmission of the data in the video frame buffer 144. Each pixel may be retrieved from the frame buffer line by line and transmitted as native video data including horizontal and vertical synchronization tags based on the clock 142. This memory fetching may run independently thereby restoring the original characteristics of native video; that is being lossless, deterministic, and reliable.

The bandwidth of the decoder apparatus 130 of FIG. 3 may be slightly larger than the native video data bandwidth requirement. For example, if the native video generates 8 Gigabits of data per second, the decoder apparatus may have slightly more than 8 Gigabit of bandwidth such as, e.g., 10 Gigabits. The transport blocks 120 may include some amount of overhead (e.g., a header) in addition to the video stream data.

Accordingly, bandwidth in excess of the native video requirements can accommodate the additional data included in transport blocks 120.

Figure 5:
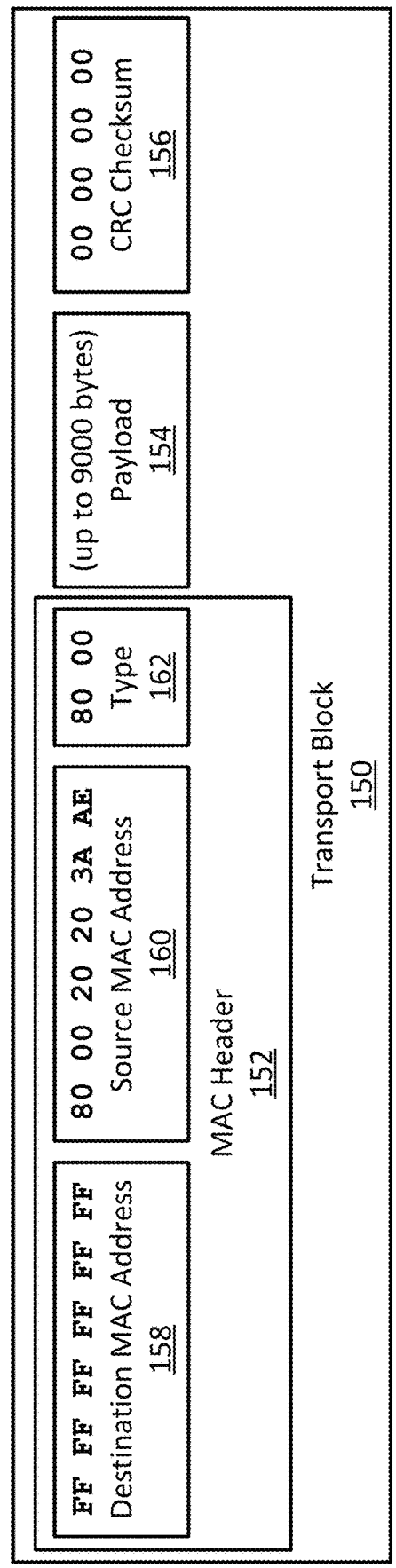
FIG. 5 is a schematic diagram of a transport block.

An exemplary transport block 150 is depicted in FIG. 5. While transport blocks as described herein may be implemented with a single address and a payload, transport blocks include additional elements to allow compatibility with various protocols, e.g., Ethernet protocols. In other words, video streams can be transmitted and received using wavelength division multiplexing with transport blocks that only include a single address and a payload. However, transport blocks may include additional elements to comply with established protocols. The transport block 150 may be a protocol data unit of the data link layer of the Open Systems Interconnection (OSI) model. The transport block 150 may include a Media Access Control (MAC) header 152, a payload 154, and a CRC checksum 156. The MAC header 152 may include a destination MAC address 158, a source MAC address 160, and a block type 162. The destination MAC address 158 may include six bytes of data, each byte represented herein as couplings of hexadecimal digits. In one embodiment, the destination MAC address 158 may indicate a multicast group that the transport block 150 is to be transmitted to. In another embodiment, the destination MAC address 158 may not be a multicast address and may be a direct MAC address. The source MAC address 160 may include six bytes of data, each byte represented herein as couplings of hexadecimal digits. The source MAC address 160 may indicate the MAC address of the apparatus that generated the transport block 150. The block type 162 may indicate what type or kind of transport block that transport block 150 is, such as, e.g., standard, jumbo, baby giant, super jumbo, etc. In at least one example, transport block 150 is a jumbo frame. The transport block 150 may be any transport block as defined by the IEEE 2002.3 Standard for Ethernet, which is incorporated herein by reference in its entirety.

The size of the payload 154 may be determined by the type of transport block. The transport block type and the corresponding payload size may be chosen based on the size of the data to be to be transmitted. The payload 154 may include a video segment and a segment number. Accordingly, the size of the transport block type of transport block 150 and the corresponding size of payload 154 may be chosen based on the size of the video frame to be transmitted. In at least one example, the transport block 150 is a jumbo block and the size of the payload 154 may be up to 30,000 bytes.

The transport block 150 may include the CRC checksum 156. CRC checksums may be used to verify the integrity of transport block 150. However, for real-time transmission of video data, it may be beneficial to ignore cyclic redundancy checks. In some examples (e.g., real-time video transmission), speed may be more important than data integrity. The CRC checksum 156 may be set to zero to indicate that the cyclic redundancy check is to be suppressed or ignored.

Figure 6:
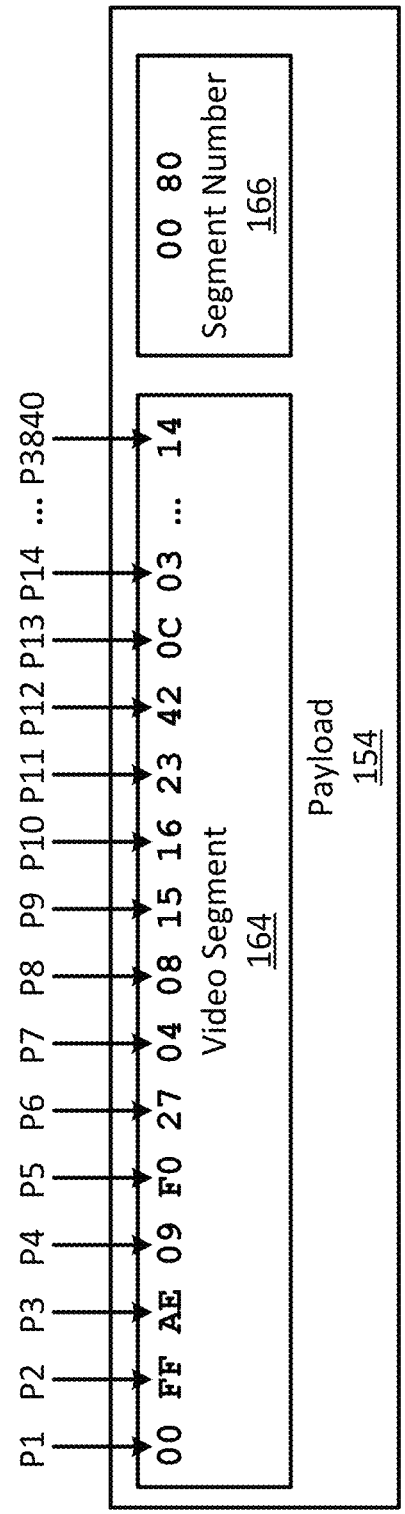
FIG. 6 is a schematic diagram of an illustrative payload of the transport block of FIG. 5 for use with the illustrative systems, apparatus, and methods described herein.

An exemplary payload 154 is depicted in FIG. 6. Payload 154 may include a video segment 164 and a segment number 166. The video segment 164 may include bytes of data (depicted in FIG. 6 as couplets of hexadecimal digits) that are representative of pixels P1-P3840. The segment number 166 may indicate the position of the pixels P1-P3840 of the video segment 164 within a video frame of native video data.

Figure 7:
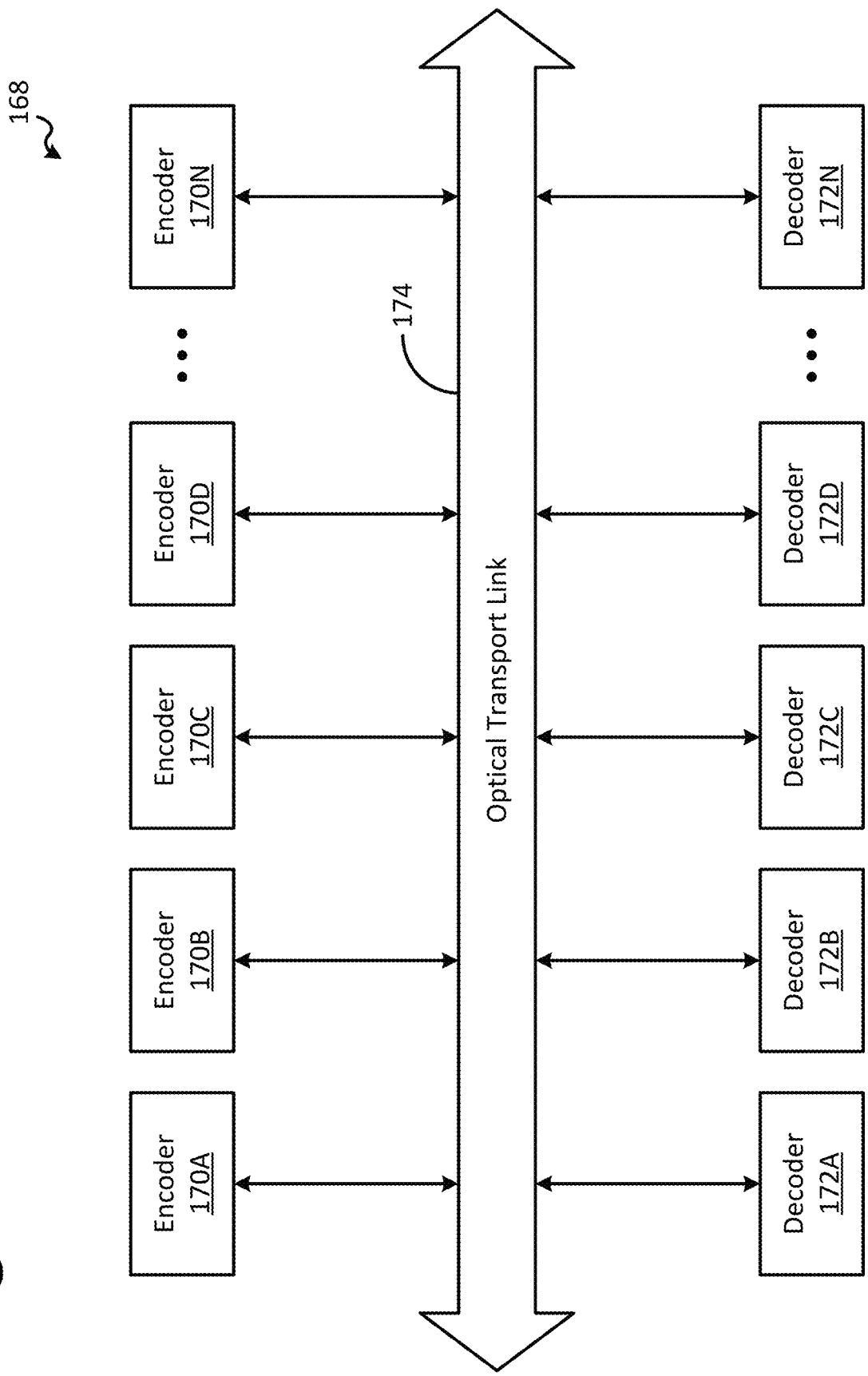
FIG. 7 is a schematic block diagram of an illustrative video coupling system.

Exemplary video coupling systems 168 are depicted in FIG. 7. The video coupling system 168 may include and optical transport link 174 and a plurality of nodes operatively coupled to an optical transport link 174. The plurality of nodes may include encoder apparatus 170A-70N (referred to collectively as encoder apparatus 170) and decoder apparatus 172A-72N (referred to collectively as decoder apparatus 172). The plurality of nodes may also include any other suitable computing apparatus or devices. The encoder apparatus 170 may include the devices, circuitry, and functionality of the encoder apparatus 110 and the processing circuitry 114 of FIGS. 1-2. The decoder apparatus 172 may include the devices, circuitry, and functionality of the decoder apparatus 130 and processing circuitry 134 of FIGS. 3-4.

The video coupling system 168 may include any number of encoder apparatus 170 and any number of decoder apparatus 172. Encoder apparatus 170 may be operatively coupled to decoder apparatus 172 via the optical transport link 174. The optical transport link 174 may provide an optical transport medium. In other words, the optical transport link 174 may provide a guided path for optical signals that allows any optically coupled optical receiver/transceiver (e.g., encoder transceiver 116 and decoder transceiver 132) to receive such optical signals. The optical transport link 174 may include any suitable apparatus to provide an optical transport medium such as, e.g., optical cables, optical fiber links, fiber optic cables, optical trenches, optical couplers, wave guides, tunable optical filters, tunable optical transmitters, etc.

Transport blocks (e.g., transport blocks 120, 150) may be transmitted and received via the optical transport link 174 in the form of optical signals. To allow simultaneous transmission of multiple video streams using transport blocks, the optical transport link 174 may define a plurality of optical channels. Each optical channel of the plurality of optical channels may define a different wavelength or frequency space or width. For example, the optical transport link 174 may define 72 optical channels between wavelength of about 1,520.25 nanometers (197,200 gigahertz) to about 1,577.03 nanometers (190,100 gigahertz). With 72 optical channels, the optical transport link can transmit up to 72 video streams to any number of subscribers (e.g., decoder apparatus 172). However, the optical transport link 174 may include any suitable number of optical channels. In general, the number of optical channels may depend on the optical transport medium used and/or the WDM scheme utilized. For example, standardized WDM schemes may be used such as Course Wavelength Division Multiplexing (CWDM) or Dense Wavelength Division Multiplexing (DWDM). The use of the International Telecommunication Union (ITU) standard for CWDM may allow for up to 18 optical channels with a channel spacing (e.g., width) of 20 nanometers. The ITU standard for DWDM may allow for up to 160 optical channels a channel spacing of 25 gigahertz.

Each of the encoder apparatus 170 may be assigned to an optical channel of the plurality of optical channels defined by the optical transport link 174. Accordingly, each of the decoder apparatus 172 can receive transport blocks from any of the encoder apparatus 170 by tuning in or switching to the optical channel assigned to an encoder apparatus. In other words, each decoder apparatus 172 can receive a desired video stream provided by one of the encoder apparatus 170 by tuning in or "listening" to the optical channel assigned to the one of the encoder apparatus 170. Furthermore, each encoder apparatus 170 can be identified by their assigned optical channel. In some embodiments, one of the plurality of nodes is configured to assign an optical channel to each of the encoder apparatus 170. The one of the plurality of nodes may be an encoder apparatus, a decoder apparatus, or other computing device.

The bandwidth of each encoder apparatus 170, each decoder apparatus 172, the optical transport link 174, and any intervening cable or device of video coupling system 168 may be slightly larger than the native video data bandwidth requirement. For example, if the native video generates 8 Gigabits of data per second, any bottlenecks of the video coupling system 168 may have slightly more than an 8 Gigabit of bandwidth such as, e.g., 10 Gigabits. In other words, each optical channel or data path may have a data bandwidth greater than the native video bandwidth requirement. By having a bandwidth greater than the native video data bandwidth requirement, additional data requirements of the transport blocks 120 (e.g., header data) may be accommodated.

Figure 8:
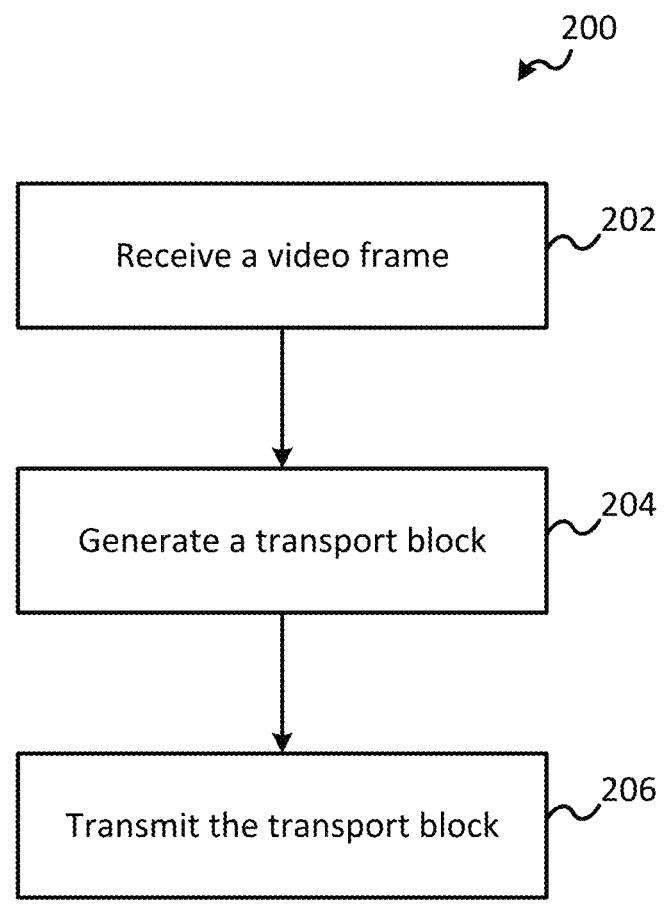
FIG. 8 is a flow diagram of an illustrative method for generating a transport block including a video segment of native video data.

An exemplary technique, or process 200, for generating a transport block including a video segment of native video data is depicted in FIG. 8. The process 200 may include receiving a video frame 202, generating a transport block 204, and transmitting the transport block 206.

A video frame may be received 202 using an encoder input (e.g., encoder input 112 of FIG. 1). A transport block may be generated 204 based on the received video frame. The generated transport block may include a video segment of the video frame. Additionally, the generated transport block may include a segment number that indicates a position of the video segment in the video frame. The transport block may be generated 204 using processing circuitry (e.g., processing circuitry 114 of FIGS. 1-2). The generated transport block may be transmitted 206 using an encoder transceiver (e.g., encoder transceiver 116). The generated transport block may be transmitted 206 on an optical channel defined by an optical transport link (e.g., optical transport link 174) using the encoder transceiver.

Figure 9:
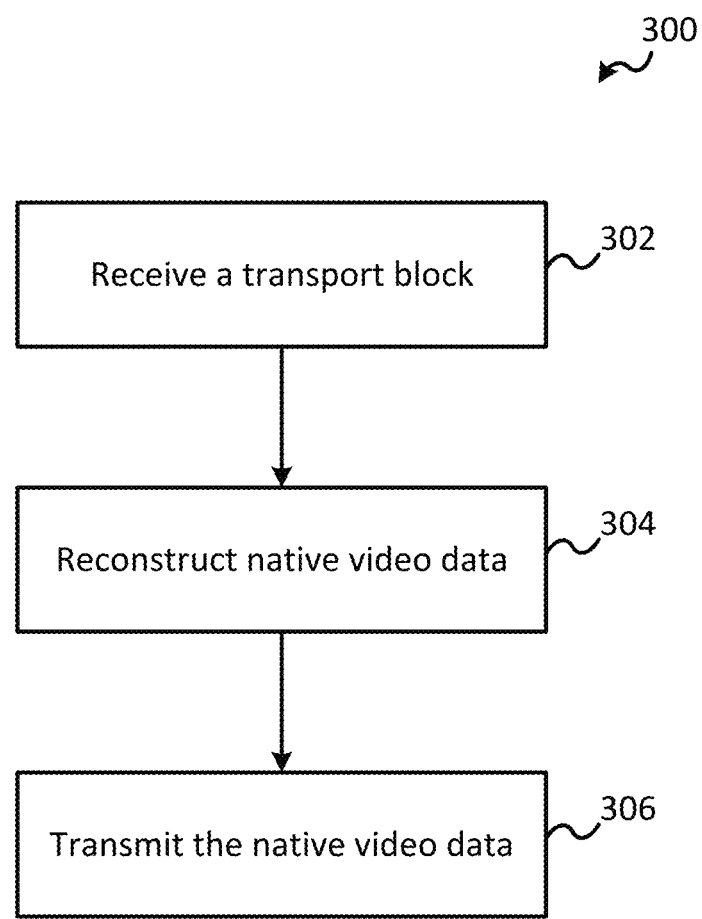
FIG. 9 is a flow diagram of an illustrative method of reconstructing native video data based on transport blocks that include segments of native video data.

An exemplary technique, or process 300, for reconstructing native video data from transport blocks is depicted in FIG. 9. The process 300 may include receiving a transport block 302, reconstructing native video data 304, and transmitting the native video data 196.

Transport blocks may be received 302 using a decoder transceiver (e.g., decoder transceiver 132 of FIG. 3). Native video data may be reconstructed 304 based on the received transport blocks. Received transport blocks may include video segments and segment numbers. Reconstructing native video data may include placing video segments in a video frame buffer (e.g., video frame buffer 144 of FIG. 4). Additionally, the video segments may be placed in the video frame buffer based on the segment number that accompanied the video segments in the transport blocks. In other words, the segment number of each transport block indicates the position of the video segment included in the transport block in a video frame. The reconstructed video data may be transmitted 306 using a decoder output (e.g., decoder output 136 of FIG. 3). The reconstructed video data may be transmitted 306 in response to the frame buffer being filled. Transmitting the reconstructed video data 306 may include transmitting a video frame. Additionally, the frame buffer may be emptied in response to the video frame being transmitted.

All references and publications cited herein are expressly incorporated herein by reference in their entirety into this disclosure, except to the extent they may directly contradict this disclosure. Illustrative embodiments of this disclosure are described and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

The invention claimed is:

1. An encoder apparatus comprising:
an encoder input to receive at least native video data;
an encoder transceiver to transmit and receive transport blocks via an optical transport link defining a plurality of optical channels using wavelength division multiplexing; and
processing circuitry operatively coupled to the encoder input and the encoder transceiver and configured to:
receive a video frame of native video data from the encoder input;
generate a transport block comprising a video segment of the video frame;
receive a return-path transport block via the encoder transceiver comprising a source address;
generate an acknowledgement transport block that comprises the source address;
transmit the transport block comprising the video segment on an optical channel assigned to the encoder apparatus using the encoder transceiver and
transmit the acknowledgement transport block on the optical channel using the encoder transceiver.

2. The apparatus of claim 1, wherein the encoder transceiver comprises an optical multiplexer.

3. The apparatus of claim 1, wherein the video segment comprises at least a portion of a video line.

4. The apparatus of claim 1, wherein the video segment comprises a horizontal video line.

5. The apparatus of claim 1, wherein the generated frame further comprises a video segment number that indicates a position of the video segment in the frame of the native video data.

6. The apparatus of claim 1, wherein the processing circuitry is further configured to:
receive user input data and/or sound data from the encoder input;
generate a transport block comprising at least a portion of the user input and/or sound data and an out-of-band segment number that indicates a type of the input and/or sound data; and
transmit the transport block comprising the input and/or sound data.

7. A decoder apparatus comprising:
a decoder transceiver to receive and transmit transport blocks via an optical transport link defining a plurality of optical channels using wavelength division multiplexing;
a decoder output to transmit at least native video data; and
processing circuitry operatively coupled to the decoder transceiver and the decoder output and configured to:
receive transport blocks from one of the plurality of optical channels using the decoder transceiver, each transport block comprising a video segment of a video frame of native video data;
reconstruct the native video data based on the received transport blocks;
transmit the native video data using the decoder output;
generate a return-path transport block comprising a source address and an input command; and
transmit the return-path transport block via the optical transport link using the decoder transceiver.

8. The apparatus of claim 7, wherein the decoder transceiver comprises an optical demultiplexer.

9. The apparatus of claim 7, further comprising an optical tuner to select between the plurality of optical channels.

10. The apparatus of claim 7, wherein the processing circuitry is further configured to retransmit the return-path transport block in response to a predetermined period of time elapsing without receipt of an acknowledgement transport block comprising the source address.

11. The apparatus of claim 7, wherein the processing circuitry is further configured to:
receive an acknowledgement transport block comprising the source address; and
cease transmitting the return-path transport block.

12. The apparatus of claim 7, wherein, to reconstruct the video frame of the native video data, the processing circuitry is further configured to place each video segment of a single video frame in a video frame buffer.

13. The apparatus of claim 7, wherein each transport block further comprises a video segment number corresponding to a position of the video segment in the video frame and the native video data is reconstructed based on at least the video segment number of each transport block.

14. The apparatus of claim 7, wherein the processing circuitry is further configured to:
receive at least one transport block comprising user input and/or sound data and an out-of-band segment number;
determine a type of data based on the out-of-band segment number; and
transmit the input and/or audio data based on the determined type of data using the decoder output.

15. A system comprising:
an optical transport link defining a plurality of optical channels; and
a plurality of nodes, each node of the plurality of nodes operatively coupled to the optical transport link, the plurality of nodes comprising:
one or more encoder apparatus, each of the one or more encoder apparatus comprising:
an input to receive at least native video data;
an encoder transceiver to transmit and receive transport blocks via the optical transport link using wavelength division multiplexing; and
encoder processing circuitry operatively coupled to the input and the encoder transceiver and configured to:
receive native video data comprising at least a video frame from the input;

generate transport blocks, each transport block comprising a video segment of the video frame;

receive a return-path transport block via the encoder transceiver comprising a source address;

generate an acknowledgement transport block that comprises the source address;

transmit the transport blocks on an optical channel assigned to the one or more encoder apparatus using the encoder transceiver; and transmit the acknowledgement transport block on the optical channel using the encoder transceiver; and one or more decoder apparatus, each of the one or more decoder apparatus comprising:

a decoder transceiver to receive and transmit transport blocks via the optical transport link using wavelength division multiplexing;

a decoder output to transmit at least native video data; and decoder processing circuitry operatively coupled to the decoder transceiver and the output and configured to:

receive the transmitted transport blocks from one of the plurality of optical channels using the decoder transceiver;

reconstruct the native video data based on the received transport blocks; and transmit the reconstructed native video data using the decoder output.

16. The system of claim 15, wherein the one or more encoder apparatus comprises a first encoder apparatus and a second encoder apparatus, and wherein each of the one or more decoder apparatus further includes an optical tuner to allow a user to switch between receiving transport blocks on the optical channel assigned to the first encoder apparatus or the optical channel assigned to the second encoder apparatus and outputting native video data based on the transport blocks received from the first encoder apparatus or the second encoder apparatus.

17. The system of claim 15, wherein the transport blocks are transmitted and received without the use of a network switch.

18. The system of claim 15, wherein one of the plurality of nodes is configured to assign the optical channel to the one or more encoder apparatus.

* * * * *